United States Patent [19]

McMullen

[11] 4,217,722
[45] Aug. 19, 1980

[54] INSECT TRAP

[76] Inventor: Malcolm McMullen, 1713 Tarleton Way, Crofton, Md. 21114

[21] Appl. No.: 958,366

[22] Filed: Nov. 7, 1978

Related U.S. Application Data

[63] Continuation-in-part of Ser. No. 773,218, Mar. 1, 1977, abandoned.

[51] Int. Cl.³ .............................................. A01M 1/14
[52] U.S. Cl. ......................................... 43/114; 43/121
[58] Field of Search ................. 43/114, 115, 116, 107, 43/121

[56] References Cited

U.S. PATENT DOCUMENTS

| 181,165 | 8/1876 | Hagen | 43/121 |
|---|---|---|---|
| 469,021 | 2/1892 | Smith | 43/114 |
| 600,530 | 3/1898 | Harig | 43/121 |
| 790,620 | 5/1905 | Crofford | 43/115 |
| 1,112,064 | 9/1914 | Gordon | 43/115 |
| 1,161,388 | 11/1915 | Johnson | 43/115 |
| 1,614,153 | 1/1927 | Pierpoint | 43/115 |
| 1,723,919 | 8/1929 | Bykowy | 43/114 |
| 2,177,670 | 10/1939 | Peirson | 43/107 |
| 2,435,317 | 2/1948 | McGrew | 43/121 |
| 3,304,646 | 2/1967 | Staley | 43/114 |
| 3,398,478 | 8/1968 | Pearsall | 43/114 |
| 3,968,590 | 7/1976 | Kitterman | 43/114 |
| 4,031,654 | 6/1977 | Gray | 43/114 |
| 4,048,747 | 9/1977 | Shanahan | 43/114 |

FOREIGN PATENT DOCUMENTS 2287169  5/1976  France ...................................... 43/116

*Primary Examiner*—Nicholas P. Godici
*Assistant Examiner*—J. T. Zatarga
*Attorney, Agent, or Firm*—Shlesinger, Arkwright, Garvey & Dinsmore

[57] ABSTRACT

An insect trap comprising upper and lower sheet member portions in opposed relation, the inner face of the upper sheet member portion having an adhesive material affixed thereto and the inner face surface of the lower sheet portion having a low coefficient of friction. The upper and lower sheet member portions are maintained in predetermined, spaced relation, and this spacing is either uniform throughout the trap or is of gradual decreasing distance from one portion of the trap to another. As insects crawl between the sheet member portions, they are trapped by engagement of their backs with the adhesive secured to the upper sheet member portion.

16 Claims, 17 Drawing Figures

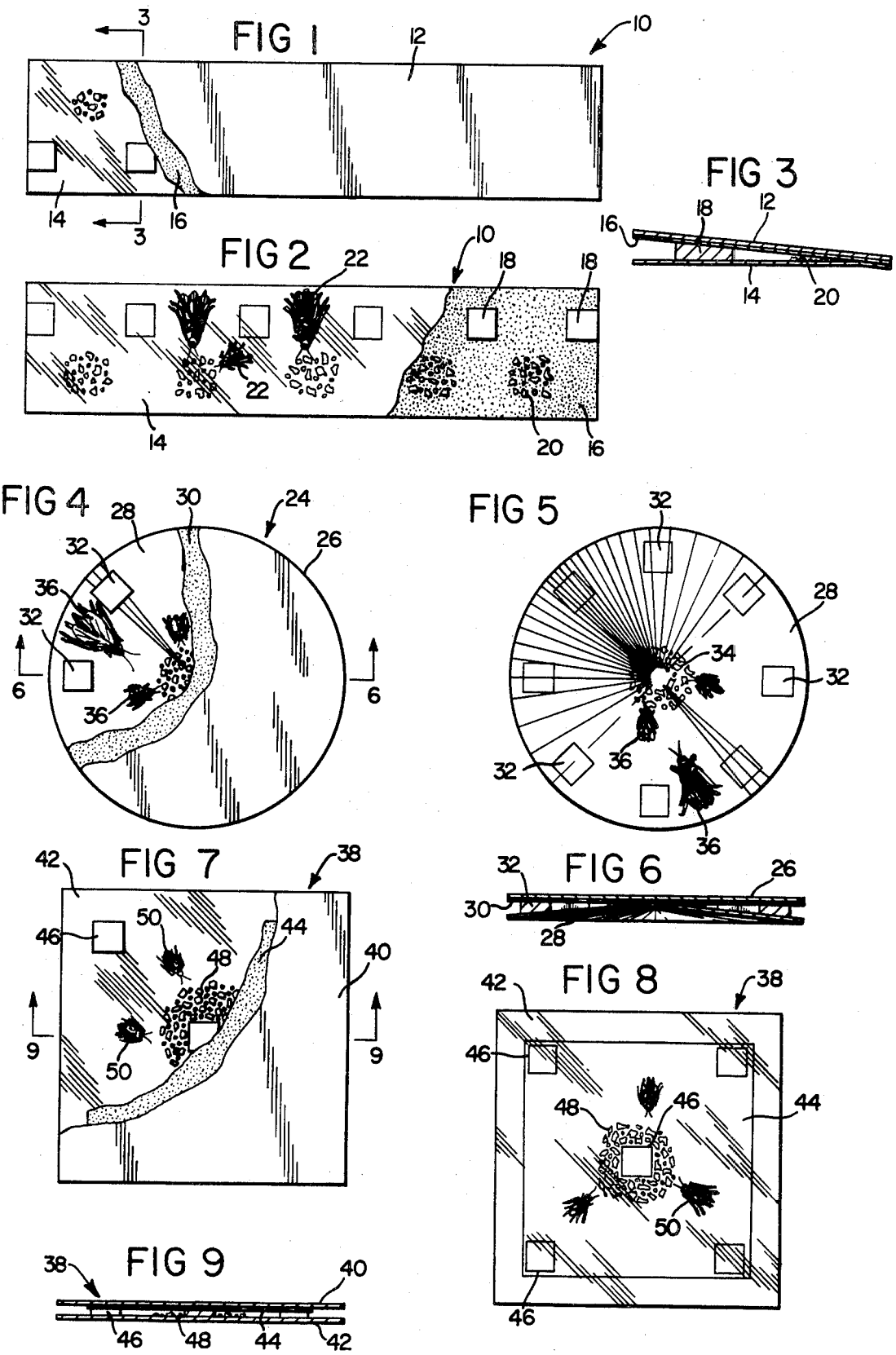

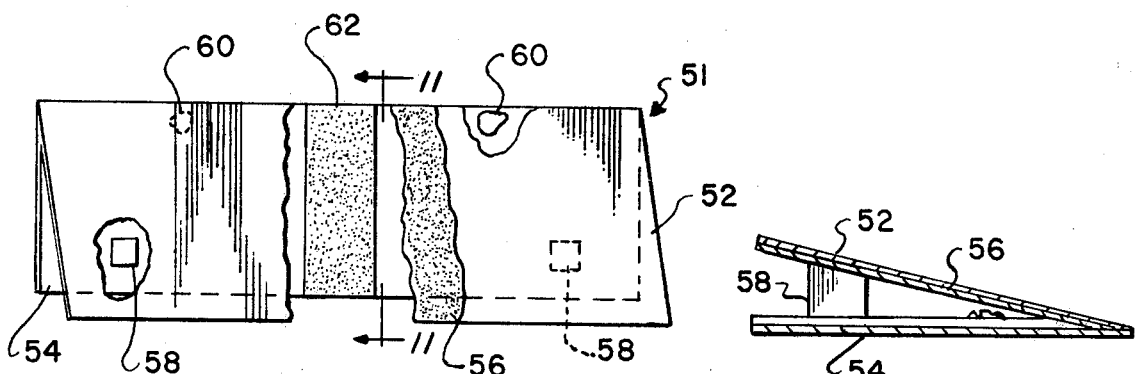
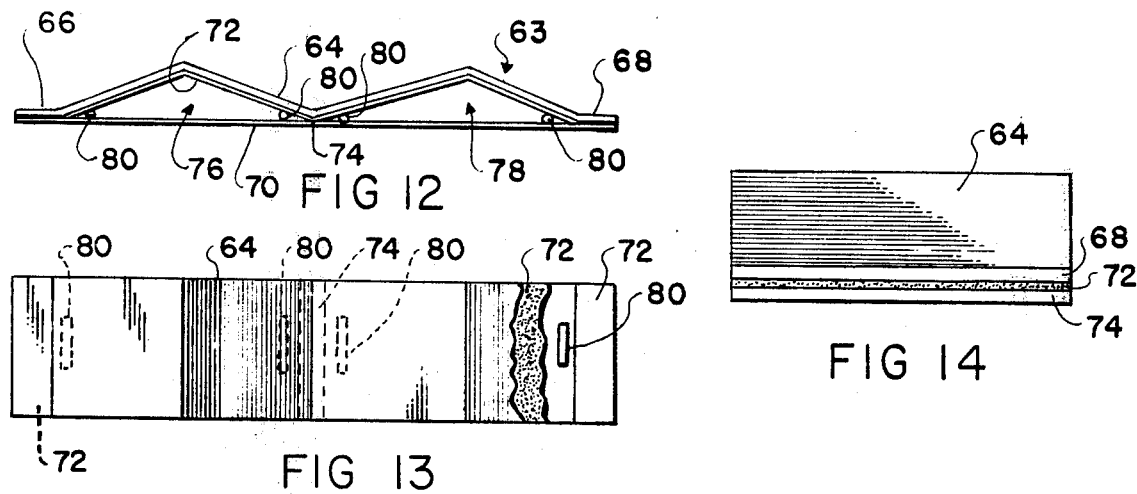
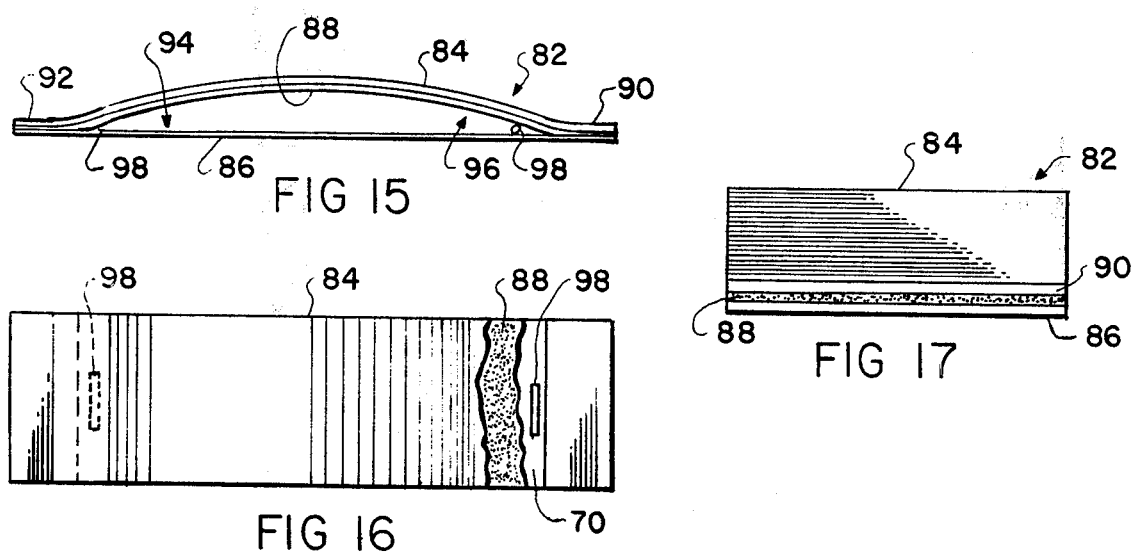

INSECT TRAP

This application is a continuation-in-part of application Ser. No. 773,218 filed Mar. 1, 1977, now abandoned.

BACKGROUND OF THE INVENTION

Various attempts have been made over the years to control the number of insects in and around homes and other building structures by various means. In recent years, insecticides and traps having toxic chemicals have been used for this purpose. However, the use of such insecticides and chemical traps is being discouraged because of the potential danger to children and domestic animals.

A number of insect traps of the general type of the present invention have been devised over the years, such as illustrated by U.S. Pat. Nos. 790,620 and 1,614,153. However, such traps have never been commercially accepted due to their limited effectiveness and a structural arrangement which is costly to manufacture and difficult to ship and store.

SUMMARY OF THE INVENTION

The insect trap of the present invention is an entirely self-contained disposable unit which includes opposed sheet portions, the inner face of at least one of the sheet portions being coated with a tacky, adhesive material. The sheet portions are maintained in predetermined spaced relation, and insects crawl between the sheet portions and become stuck by the tacky adhesive material. Bait may be placed inwardly of the trap to lure insects into the trap.

The insect trap preferably comprises upper and lower sheet portions, the tacky adhesive material being applied to the inner face of the upper sheet portion and the inner face of the lower sheet portion being provided with a surface having a low coefficient of friction whereby the back of the insect will become stuck against the adhesive material of the upper sheet portion and unable to get any traction on the surface of the lower sheet portion to free itself and escape from the trap. If desired, an adhesive material may be secured to a part or parts of the lower sheet portion.

The opposed sheet portions of the trap may be positioned in uniformly spaced relationship to trap insects of similar size, or the distance between the sheet portions may be progressively decreased from one portion of the trap to another. Traps of different geometric shapes, polygonal, including rectangular, square and circular, are equally effective and may be of a wide variety of sizes.

One of the sheet portions, preferably the lower sheet portion is preferably made of a clear plastic material, in order to provide a surface having a low coefficient of friction, and also to permit visual inspection of the traps to determine when it is full and in need of replacement.

The present insect trap is of simple, economic construction, and the structural arrangement thereof permits ready shipment and storage, without danger of the tacky substance applied to one of the sheet portions, or the insects within the trap, coming in contact with the user or other extraneous objects.

DESCRIPTION OF FIGURES OF THE DRAWINGS

FIG. 1 is a top plan view of the insect trap of the present invention, a portion thereof being broken away to disclose details of construction;

FIG. 2 is a bottom plan view of the present insect trap, a portion thereof being broken away to disclose details of construction;

FIG. 3 is an enlarged sectional view taken along the line 3—3 of FIG. 1, looking in the direction of the arrows;

FIG. 4 is a top plan view of a modified form of the present invention, portions thereof being broken away to disclose details of construction;

FIG. 5 is a bottom plan view of the modified form of invention illustrated in FIG. 4;

FIG. 6 is a sectional view taken along the line 6—6 of FIG. 4, looking in the direction of the arrows;

FIG. 7 is a top plan view of another modified form of the present invention; portions thereof being broken away to disclose details of construction;

FIG. 8 is a bottom plan view of the form of invention illustrated in FIG. 7;

FIG. 9 is a sectional view taken along the line 9—9 of FIG. 7, looking in the direction of the arrows;

FIG. 10 is a top plan view of still another form of the insect trap of the present invention, portions thereof being broken away to disclose details of construction;

FIG. 11 is a sectional view taken along the line 11—11 of FIG. 10, looking in the direction of the arrows;

FIG. 12 is a side elevational view of a further modification of insect trap of the present invention;

FIG. 13 is a top plan view of the insect trap of FIG. 12;

FIG. 14 is an end elevational view of the insect trap of FIG. 12;

FIG. 15 is a side elevational view of another modified form of insect trap;

FIG. 16 is a top plan view of the insect trap of FIG. 15, and

FIG. 17 is an end elevational view of the insect trap of FIG. 15.

DESCRIPTION OF FORM OF INVENTION ILLUSTRATED IN FIGS 1 TO 3

In FIGS. 1 to 3 there is illustrated an insect trap generally designated 10 of rectangular conformation which comprises an upper sheet portion 12 preferably of an opaque flexible or inflexible material such as cardboard, plastic or wood, and a lower sheet portion 14 which is substantially the same size as upper sheet 12. Lower sheet portion 14 may also be made of any suitable flexible or inflexible opaque material but is preferably of a flexible plastic, the surface of which has a low coefficient of friction, which plastic material is transparent in order that the trap may be visually inspected in order to determine when the trap is full and must be replaced. If desired, the trap may be formed from a single sheet of material which is folded in half to form the upper and lower sheet portions.

In accordance with the present invention, a tacky coating such as applied to flypaper, or any other suitable adhesive providing a sticky surface, is adhered to the inner face of upper sheet portion 12 as indicated at 16, and is substantially co-extensive with the length and width thereof. A plurality of separators 18 which may be of wood, plastic, cardboard or other suitable material, are placed in spaced relation adjacent a longitudinal edge of upper sheet 12 and are secured thereto by adhesive 16. Separators 18 thereby maintain upper sheet portion 12 and lower sheet portion 14 in predetermined spaced relation in the area of the trap adjacent the separators.

As shown in FIG. 3, the edge of lower sheet portion 14 remote from separators 18, is adhered to the opposed edge of upper sheet portion 12 in any suitable manner, such as with adhesive 16. This provides a trap opening between angularly disposed upper and lower sheet portions which progressively decreases from one longitudinal edge of the trap to the other in order to accommodate insects of different sizes. It has been found that an angular relationship between the sheet members of 5° to 15° and a front opening of the trap of ⅛ inch to ½ inch produce optimum results in trapping German cockroaches of various sizes and other insects commonly found in and around houses and like structures.

In order to lure insects into the trap, bait 20 may be placed interiorly thereof at a point adjacent the juncture of upper and lower sheet portions 12 and 14. As shown in FIG. 2, insects 22 enter the trap and become stuck to adhesive 16, large insects being trapped nearer the entrance than smaller insects because of the progressively decreasing space between sheet member portions 12 and 14.

In use of the insect trap, the trap is placed on any suitable planar surface so that the insect may easily crawl onto lower sheet 14 and move towards bait 20 until the back of the insect engages adhesive 16. The reduced traction of lower sheet portion 14 prevents the escape of insects which have only lightly engaged the adhesive on the upper sheet portion since, in trying to escape, the insect moves up and down, increasing the back area in contact with the adhesive. By making upper sheet portion 12 of opaque material, the insects are not visible within the trap when it is in position of use but, by simply turning the trap over, the insects can be viewed through translucent or transparent lower sheet portion 14 to determine whether the trap is full.

After the trap has become filled, it is simply thrown in the trash and replaced by a new trap. Due to the fact that the sticky adhesive 16 in interiorly of the trap, it never comes in contact with the user or other extraneous objects at any time during shipment, storage or use. Furthermore, the user never touches the trapped insects since they are interiorly of the trap.

DESCRIPTION OF FORM OF INVENTION ILLUSTRATED IN FIGS. 4 TO 6

In FIGS. 4 to 6 is illustrated a modified form of the present invention wherein the insect trap generally designated 24 is of circular conformation and includes an upper disc 26 and a lower disc 28 of a size similar to disc 26 and in facing relationship thereto. Discs 26 and 28 may be made of cardboard, plastic or other suitable material, disc 26 preferably being opaque and disc 28 of a transparent plastic material, the inner surface of which has a low coefficient of friction.

Just as in the form of invention illustrated in FIGS. 1 to 3, a tacky coating such as applied to flypaper, or other suitable adhesive 30, is adhered to the inner face of upper disc 26. A series of separators 32 of predetermined thickness made of plastic, wood, cardboard or other suitable material are secured to adhesive 30 of top disc 26 in spaced relationship adjacent the periphery of the trap, as shown in FIG. 5, thereby maintaining discs 26 and 28 in predetermined spaced relationship at the opening of the trap.

As shown in FIG. 6, the opening between the discs progressively decreases from the outer edges of the trap to the center thereof, at which point lower disc 28 is adhered to adhesive 30 of upper disc 26 as indicated at 34. If desired, discs 26 and 28 may be stapled together or secured in any other suitable fashion. This provides a circular trap wherein insects of different sizes may enter at any point along the periphery thereof and become stuck by engagement with adhesive 30.

The angular relationship between discs 26 and 28 at the opening of the trap is preferably 5° to 15° as shown to advantage in FIG. 6, and the space between the discs at the outer periphery thereof, ⅛ inch to ½ inch. Insects 36 of different sizes are thereby trapped by virtue of the progressively decreasing distance between the discs, the larger insects being trapped near the opening of the trap and smaller insects nearer the center thereof.

DESCRIPTION OF FORM OF INVENTION ILLUSTRATED IN FIGS. 7 TO 9

In FIGS. 7 to 9 there is illustrated a further modification of the present invention wherein there is provided an insect trap 38 of square conformation including an upper sheet portion 40 and a lower sheet portion 42 of cardboard, plastic or the like which is of either flexible or rigid construction. Just as in the other forms of the invention, upper sheet portion 40 is preferably of opaque material and lower sheet portion 42 may be of opaque material but is preferably of a transparent plastic material, the inner surface of which has a low coefficient of friction.

Adhesive 44 is applied to the inner face of upper sheet portion 40 and preferably comprises a double faced carpet tape manufactured under the trademark Hug-A-Rug by Custom Tapes, Inc. of Chicago, Illinois, which adhesive, as shown, extends to a point adjacent, but spaced from, the lateral edges of upper sheet portion 40.

Separators 46 of wood, plastic or other suitable material are secured to adhesive 44 at the corners and center thereof and are also adhesively secured to sheet 42 to maintain the sheets in substantially parallel relationship, with a fixed, uniform distance between the sheets, as shown to the advantage in FIG. 9. Bait 48 is secured to adhesive 44 near the center of the trap.

This form of the invention is designed to trap one particular size of insect as indicated at 50 as opposed to the forms of invention illustrated in FIGS. 1 to 6 wherein it is desired to provide a trap which will accommodate insects of various sizes. Accordingly, the distance between the two sheets is varied in accordance with the size of insect to be trapped. This distance is normally in the range of ⅛ inch to ½ inch.

DESCRIPTION OF FORM OF INVENTION ILLUSTRATED IN FIGS. 10 AND 11

In FIGS. 10 and 11, there is illustrated a modification of the present invention which is basically similar to the form of invention illustrated in FIGS. 1 to 3. In accordance with this form of the invention, there is provided an insect trap comprising an upper sheet portion 52 and a lower sheet portion 54, both of flexible or rigid cardboard, plastic or the like. The upper and lower sheet portions may be formed from a single sheet of material is desired. Preferably, upper sheet portion 52 is opaque, and lower sheet portion 54 is of a transparent, plastic material, the inner surface of which has a low coefficient of friction. Suitable adhesive 56 is applied to the inner face of upper sheet portion 52.

Spaced separators 58 of wood, plastic, cardboard, or other suitable material, are placed in spaced relation adjacent an edge of upper sheet portion 52 and secured thereto by adhesive 56. The upper and lower sheet portions are thereby maintained in predetermined, spaced relation in the area of the trap adjacent the separators. Bait 60 is positioned inwardly of the trap.

As shown in FIG. 11, the edge of lower sheet portion 54 remote from separators 58, is adhered to the opposed edge of upper sheet portion 52 in any suitable manner, such as with adhesive 56. The trap opening thereby progressively decreases from one longitudinal edge of the trap to the other in order to accommodate insects of different sizes.

It is a salient feature of this form of the invention to provide lower sheet portion 54 with an adhesive strip 62 extending transversely thereof intermediate the ends of the sheet portion. Adhesive strip 62 may be of the same composition as adhesive strip 56, or may be of some other composition. Adhesive strip 56 may be of any desired configuration such as rectangular, as shown, or triangular or circular, may comprise several spaced strips or may extend only partially through the sheet portion width.

The addition of the adhesive strip on the lower sheet portion increases trap efficiency in catching very small insects, such as hatchlings, which would not otherwise be likely to be caught by the present structural arrangement, or by other conventional traps.

DESCRIPTION OF FORM OF INVENTION ILLUSTRATED IN FIGS. 12 TO 14

In FIGS. 12 to 14, there is illustrated still another modified form of the present invention wherein a single trap embodies a plurality of trapping areas.

In this form of the invention, the trap is of substantially rectangular shape, and includes an upper sheet portion 64 which, as viewed in FIG. 12, is of generally M-shape configuration, the lateral portions of which are bent outwardly to form flanges 66 and 68. A lower sheet portion is indicated at 70 and is in opposed relation to upper sheet portion 64. Just as in the other forms of the invention, upper sheet portion 64 is preferably opaque and lower sheet portion 70 is preferably of transparent plastic material. A suitable adhesive 72 is applied to the inner face of upper sheet portion 64, including flanges 66 and 68, which adhesive serves to adhere flanges 66 and 68 to the opposed edge portions of lower sheet portion 70. Additionally, the intermediate lowermost part of M-shaped upper sheet portion 64 is adhered to the intermediate portion of lower sheet portion 70 as indicated at 74. This provides a pair of trapping areas designated at 76 and 78.

It will be noted from FIG. 12 that a plurality of converging trap portions is thereby formed by the progressive convergence of parts of upper sheet portion 64 with opposed areas of lower sheet portion 70, and bait 80 is positioned proximate the converging areas to attract the insects inwardly of the trap so that the backs of the insects will become stuck. As in the other forms of the invention, the low coefficient of friction of the inner face of lower sheet portion 70 does not enable the insect to get sufficient traction to free itself from engagement with adhesive 72.

DESCRIPTION OF FORM OF INVENTION ILLUSTRATED IN FIGS. 15 TO 17

In FIGS. 15 to 17, there is illustrated another modified form of the present invention wherein there is provided an insect trap 82 of rectangular conformation including an upper sheet portion 84 and a lower sheet portion 86. Upper sheet portion 84 is preferably made of a flexible, opaque, cardboard, plastic or the like and lower sheet portion 86 is preferably made of transparent plastic, the surface of the inner face having a low coefficient of friction.

The inner face of upper sheet portion 84 is provided with a suitable adhesive 88 and opposed edges of the upper and lower sheet portions are secured together by the adhesive as indicated at 90 and 92.

It will be noted from a consideration of FIG. 15 that, by virtue of the flexibility of upper sheet portion 84, the main body of the upper sheet portion is in spaced relation to the lower sheet portion to provide a dome effect, producing a gradual convergence of the upper and lower sheet portions together to produce trapping areas 94 and 96 in which suitable bait 98 is positioned for luring the insects.

In all forms of the present invention, the bait employed for luring the insects into the trap can comprise a variety of materials for different insects, including, but not limited to, alfalfa and bonemeal, flour dough with suitable additives such as orange juice, molasses or honey, fruit juices and vinegar with sugar and water. It has been found that a bait composed of the following ingredients produces excellent results: Dry skim milk 14%, whole wheat flour 30%, wheat bran 12%, frozen orange concentrate 8% and honey 36%.

With the insect trap of the present invention, simple, economic and effective means are provided for trapping insects normally found in and around the home or like structure. Trapping of the insects is carried out without the use of poisonous substances and wherein the adhesive materials and trapped insects do not come in contact with the user or other objects. It is furthermore readily determined by visual inspection when the trap is full, at which time the present trap is thrown in the trash and replaced by a new trap.

While there has herein been disclosed the presently preferred form of this invention, it is to be understood that such has been done for purposes of illustration only, and that various changes may be made therein within the scope of the appended claims.

I claim:

1. An insect trap for placement on a planar surface comprising
   (a) upper and lower sheet portions of substantially the same size arranged in opposed relation, the lower sheet portion being engaged with the planar surface
   (b) means for connecting said upper and lower sheet portions together, and leaving the remainder of the sheet portions spaced a predetermined distance apart
   (c) said lower sheet portion being made of a plastic material having a slick surface, and
   (d) adhesive means on the inner face of said upper sheet portion whereby, the backs of the insects will engage the adhesive means on the upper sheet portion, the insects feet will slip upon being caught by their backs and the insects will be unable to generate sufficient traction to free themselves from the trap.

2. The insect trap of claim 1, wherein
   (a) said plastic lower sheet portion is transparent.
3. The insect trap of claim 1, wherein
   (a) said upper and lower sheet portions are in substantially parallel relationship, with a fixed, uniform distance therebetween.
4. The insect trap of claims 1 or 3, with the addition of
   (a) separators between, and in contiguous relation with, said upper and lower sheet portions for maintaining the latter a predetermined distance apart.
5. The insect trap of claim 1, wherein
   (a) said upper and lower sheet portions are substantially circular.
6. The insect trap of claim 1, wherein
   (a) said upper and lower sheet portions are substantially rectangular.
7. The insect trap of claim 1, wherein
   (a) adhesive means is applied to a part of the inner face surface of said lower sheet portion.
8. An insect trap for placement on a planar surface, comprising
   (a) upper and lower sheet portions of substantially the same size arranged in opposed relation, the lower sheet position being engaged with the planar surface
   (b) said upper and lower sheet portions converging toward each other inwardly of the trap to catch different sized insects at different points within the trap
   (c) means for connecting said upper and lower sheet portions together, and leaving the remainder of the sheet portions spaced a predetermined distance apart
   (d) said lower sheet portion being made of plastic material having a slick surface, and
   (e) adhesive means on the inner face of said upper sheet portion whereby, the backs of the insects will engage the adhesive means on the upper sheet portion, the feet of the insects will slip upon being caught by their backs, and the insects will be unable to generate sufficient traction to free themselves from the trap.
9. The insect trap of claim 8, wherein
   (a) said means for connecting said upper and lower sheet portions together comprise separators interposed between said upper and lower sheet portions and in contiguous relation therewith, proximate the entrance of the trap.
10. The insect trap of claim 8, wherein
    (a) said converging upper and lower sheet portions are of substantially rectangular shape, and
    (b) the opening between said upper and lower sheet portions progressively decreases from one longitudinal edge to the other, and the proximate, opposed longitudinal edges thereof are joined together.
11. The insect trap of claim 8, wherein
    (a) said upper and lower sheet portions are substantially circular, and
    (b) the opening between said upper and lower sheet portions progressively decreases from the outer periphery thereof to the center, at which point they are joined together.
12. The insect trap of claim 8, wherein
    (a) said plastic lower sheet portion is transparent.
13. The insect trap of claim 8, with the addition of
    (a) a bait placed on said lower sheet portion inwardly of the trap.
14. The insect trap of claim 8, wherein
    (a) said upper sheet portion is of generally M-shape configuration, and
    (b) means for adhering the lower terminals and the lowermost intermediate part of said M-shape upper sheet portion to said lower sheet portion, to provide a plurality of trapping areas.
15. The insect trap of claim 8, wherein
    (a) said upper sheet portion is flexible, and
    (b) opposed edges of said flexible sheet portion are secured to said lower sheet portion and the main portion of said upper sheet portion is in spaced relation to said lower sheet portion, to provide a dome effect, producing a gradual convergence of the upper and lower sheet portions together to produce trapping areas.
16. The insect trap of claim 8, wherein
    (a) adhesive means is applied to a part of the inner surface of said lower sheet portion.

* * * * *